Sept. 11, 1956   F. W. BROOKS   2,762,463
AUTOMATIC WEAR ADJUSTMENT BRAKES
Filed Dec. 23, 1953   2 Sheets-Sheet 1

INVENTOR.
FRANK W. BROOKS
BY Craig V. Morton
ATTORNEY

INVENTOR.
FRANK W. BROOKS
BY
Craig V. Morton
ATTORNEY

United States Patent Office 2,762,463
Patented Sept. 11, 1956

2,762,463
AUTOMATIC WEAR ADJUSTMENT FOR BRAKES

Frank W. Brooks, Dayton, Ohio, assignor to General Motors Corporation, Detroit, Mich., a corporation of Delaware Application December 23, 1953, Serial No. 400,005

6 Claims. (Cl. 188—79.5)

This invention relates to brake structures, and particularly to adjusting devices to adjust the clearance between the brake shoes and the brake drum of the brake structure. More specifically, the invention relates to an adjusting apparatus to maintain substantially constant the clearance between the brake shoes and the brake drum of a brake structure to compensate for wear of the brake linings.

An object of the invention is to provide an adjusting mechanism for a brake structure for a motor vehicle to adjust the position of the brake shoes relative to the brake drum automatically in response to movement of the brake shoes relative to the brake drum.

It is another object of the invention to accomplish the foregoing object by means of a lever and cam mechanism that is carried on one of the brake shoes in a manner to provide for relative motion between the levers of the lever mechanism to accomplish the desired adjustment between the brake shoes and the brake drum.

Further objects and advantages of the present invention will be apparent from the following description, reference being had to the accompanying drawing wherein a preferred form of the invention is clearly shown.

Figures 1, 2:
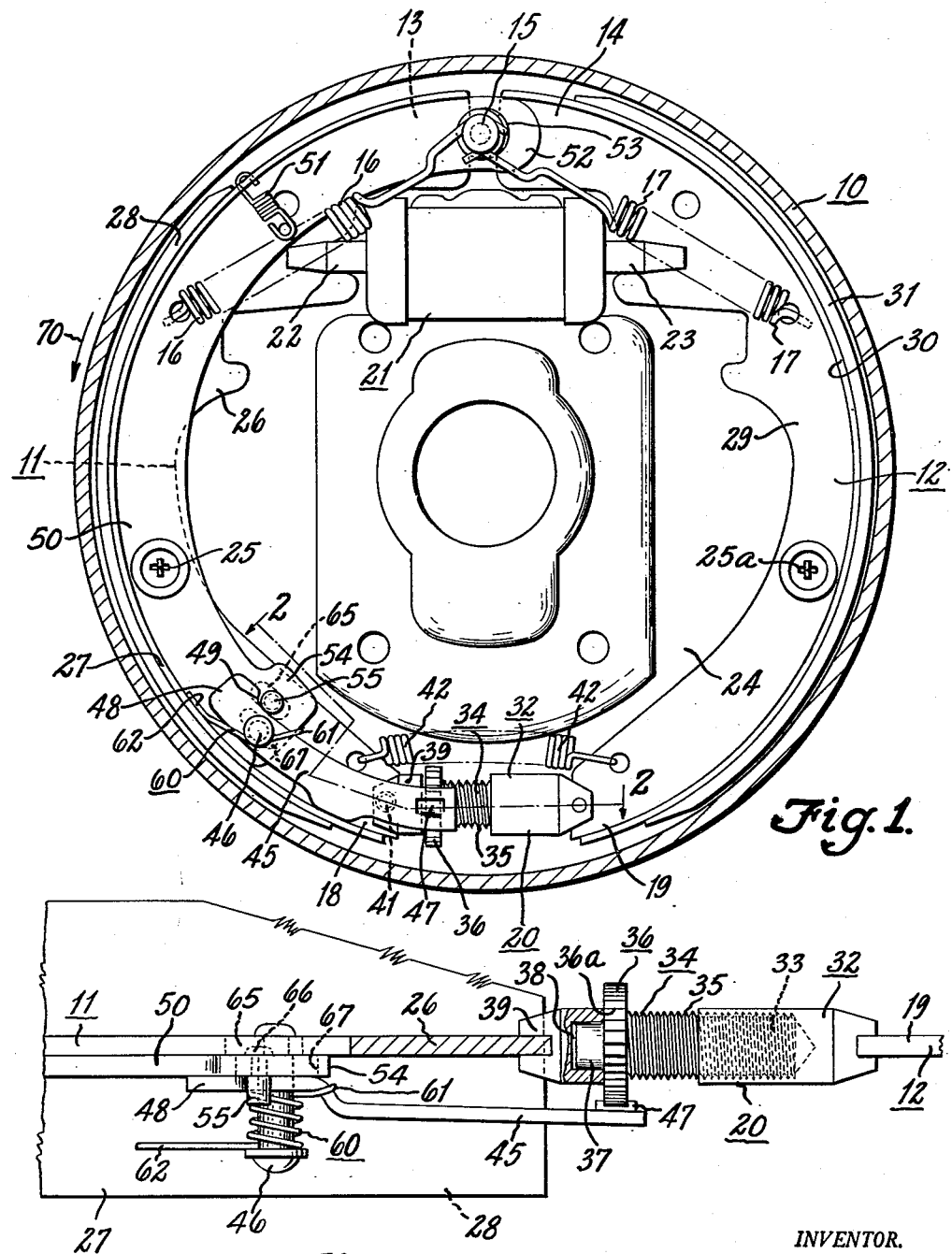
Figure 1 is a cross sectional view of a brake structure showing the primary parts of the brake mechanism in elevation.
Figure 2 is a cross sectional view taken along line 2—2 of Figure 1.
Figure 4:
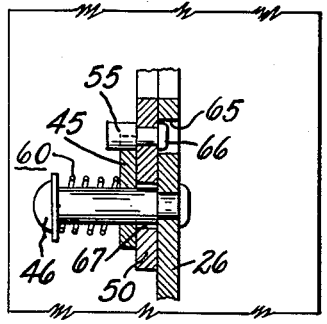
Figure 4 is a cross section along line 4—4 of Figure 3.

In this invention the brake structure includes a brake drum 10 within which there is positioned the brake shoes 11 and 12. Adjacent ends 13 and 14 of the brake shoes 11 and 12 engage an anchor pin 15, these ends being retained against the anchor pin by means of the retraction springs 16 and 17.

The opposite adjacent ends 18 and 19 of the brake shoes 11 and 12 respectively are connected with opposite ends of a brake shoe adjusting device 20 which will be hereinafter more fully described.

An applying device comprising a hydraulic wheel cylinder 21 is placed between the adjacent ends 13 and 14 of the brake shoes to effect movement of the brake shoes relative to the brake drum by extension of the plungers 22 and 23 projecting from the wheel cylinder 21. The wheel cylinder 21 receives hydraulic fluid under pressure from the hydraulic brake system provided on a motor vehicle.

The anchor pin 15 is supported upon the usual backing plate 24 for the brake structure, the brake shoes 11 and 12 being resiliently supported upon the backing plate 24 by means of the retaining spring elements 25 and 25a.

The brake shoe 11 includes a rib 26 radially disposed with reference to the arcuate shaped rim 27 that supports the brake lining 28. Similarly, the brake shoe 12 has a rib 29 extending radially with reference to the brake shoe rim 30 that supports the brake lining 31.

The adjusting device 20 includes a sleeve element 32 having an internal thread 33 that receives the stud 34 having the externally threaded portion 35. The stud 34 includes a ratchet wheel portion 36 that has ratchet serrations 36a on the periphery thereof. The stud 34 also includes a smooth walled portion 37 positioned within the smooth walled recess 38 in the connection member 39 whereby the stud 34 can rotate with reference to the element 39 as well as with reference to the sleeve element 32.

The sleeve element 32 is connected with the end 19 of the brake shoe 12 by means of the pivot connection 40. Similarly, the element 39 has the pivot connection 41 attaching it to the end 18 of the brake shoe 11. Since the rib 26 of the shoe 11 engages the element 39 and the rib 29 of the shoe 12 engages the element 32, these elements cannot rotate relative to one another, but the stud 34 can rotate with respect to these elements to provide for axial extension of the adjusting device 20 and thus effect adjustment between the brake shoes 11 and 12 and the brake drum 10.

A tension spring 42 extends between the ends 18 and 19 of the brake shoes to retain the adjusting device 20 in assembled relationship. This spring 42 also engages the ratchet serrations 36a to prevent complete freedom of rotation of the stud 34 and yet permit its rotation as effected by the actuating device hereinafter described.

The actuating device to effect rotation of the stud 34 relative to the sleeve 32 includes a lever actuating member 45 that is supported upon the end 18 of the brake shoe 11 by means of a pivot pin 46. One end of the lever 45 has a ratchet pawl 47 that engages the ratchet serrations 36a on the stud member 34. The opposite end of the lever 45 carries an enlarged head 48 forming a cam surface 49. It will be apparent that oscillating movement of the lever 45 about the pivot 46 will effect rotation of the member 34 through the medium of the ratchet pawl 47 and the ratchet serrations.

The actuating lever 45 is operated by an operating member 50 carried by the brake shoe 11. The operating member 50 rests against one face of the rib 26 of the shoe 11 and is spring pressed against this rib by means of the spring retainer 25 that also positions the shoe 11 against the backing plate 24.

The operating member 50 is an arcuately shaped member having the outer periphery engaging the shoe rim 27 and is spring held against this rim by means of a tension spring 51.

The operating member 50 has the end 52 thereof provided with an elongated opening 53 that provides engagement with the anchor pin 15. The elongated opening 53 thus provides a lost motion connection between the anchor pin and the operating member 50.

The opposite end 54 of the operating member 50 carries a projecting pin 55 that is adapted to engage the cam surface 49 on the actuating lever 45 to effect rotation of the lever 45 about the pivot pin 46.

The actuating lever 45 is spring urged against the operating member 50 by means of a compression torsion spring 60 carried on the pivot pin 46, one end 61 of the spring 60 engaging the lever 45 to urge it in a clockwise direction while the end 62 of the spring 60 engages the rim 27 of the brake shoe 11.

The rib 26 of the brake shoe 11 is provided with a slot 65 to receive the head 66 of the projecting pin 55 and allow for relative movement between the operating member 50 and the rib 26. The operating member 50 is provided with an elongated slot 67 that receives the pivot pin 46 to provide for relative movement between the operating member 50 and the actuating lever 45.

In operation, when the brake mechanism is inactive, the several parts thereof assume the position illustrated in Figure 1 with the free side of the slot 53 on the right hand side of the anchor pin 15. Delivery of hydraulic fluid under pressure to the wheel cylinder 21 effects outward extension of the plungers 22 and 23 to expand the brake shoes 11 and 12 into engagement with the drum 10. The brake structure illustrated in the drawings is of the duo-servo type wherein initial engagement of the brake shoes with the brake drum effects rotation of the brake structure in the direction of rotation of the brake drum. Thus assuming rotation of the brake drum to be as indicated by the arrow 70, the initial engagement of the brake shoes with the brake drum will urge the brake structure to rotate in a counter-clockwise direction to maintain the end of the brake shoe 12 in engagement with the anchor pin 15. Thus substantially all of the movement required to engage both brake shoes with the brake drum occurs in the primary brake shoe 11.

Figure 3:
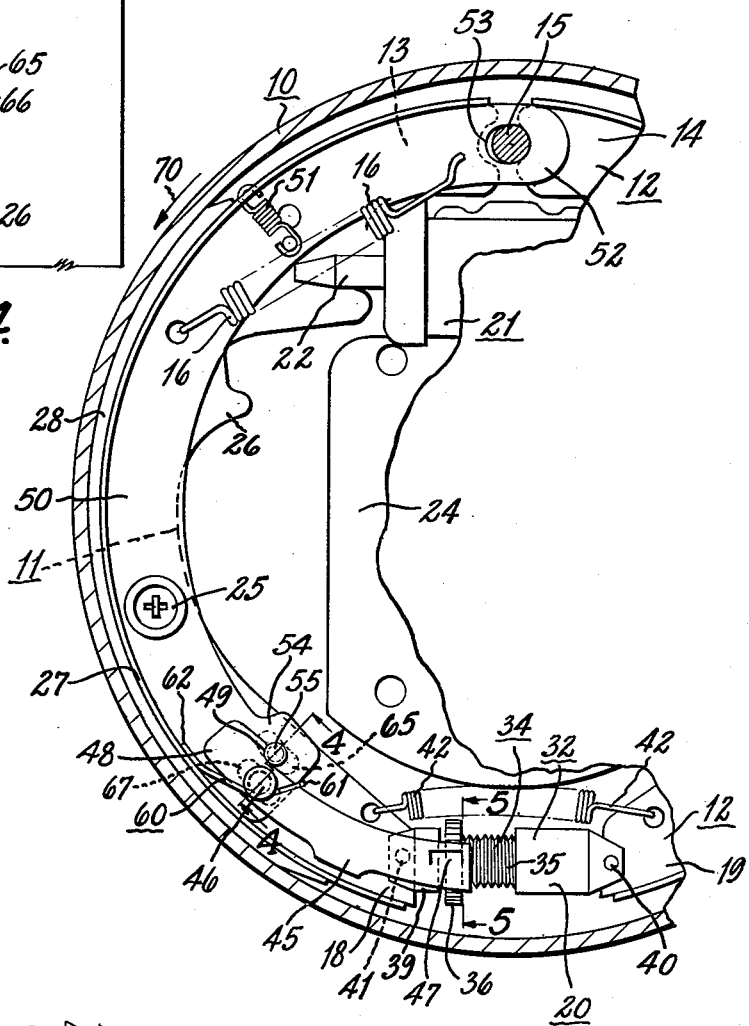
Figure 3 is a cross sectional view of a portion of the brake mechanism illustrated in Figure 1 but showing the same in an operating position.
Figure 5:
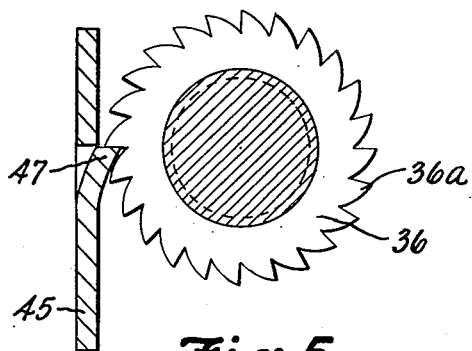
Figure 5 is a cross section along line 5—5 of Figure 3.

During the initial portion of the movement of the brake shoe 11, the operating member 50 will move concurrently with the brake shoe 11 to the extend of the clearance provided in the elongated opening 53. This amount of movement of the brake shoe and the operating member provides for the normal brake shoe clearance between it and the brake drum. After the operating member 50 assumes the position illustrated in Figure 3 the remaining movement of the brake shoe 11 will be independent of the operating member 50. Since the actuating lever 45 is pivotally carried on the brake shoe 11, the latter portion of the movement of this brake shoe will effect movement between the actuating lever 45 and the pin 55 carried on the operating member 50. This relative movement between the lever 45 and the projecting pin 55 causes the cam surface 49 to rotate the lever 45 counter-clockwise about the pivot 46.

When the brakes are retracted, reverse movements occur with the torsion spring 60 returning the lever 45 to the position illustrated in Figure 1.

At the initial setting of the adjustment of the brake shoes 11 and 12 relative to the brake drum 10, the lost motion connection between the operating member 50 and the anchor pin 15 provides for insufficient relative movement between the operating member and the lever 45 to cause the pawl 47 to move a distance equal to the distance between adjacent ratchet serrations 37 on the member 34.

However, as the brake lining wears, the movement of the brake shoes relative to the drum will increase to such an extent that the movement of the operating member 50 relative to the lever 45 will ultimately cause the pawl 47 to move a distance at least equal to or greater than the distance between adjacent ratchet serrations 36a on the member 34, whereupon the pawl 47 will drop behind the next ratchet serration and cause the member 34 to be rotated.

It will of course be understood that the operating member 50 and the actuating lever 45 could be carried upon the secondary brake shoe 12 with exactly the same operating conditions being created, the only difference being that the brake adjusting mechanism would function only when a reverse braking occurs in place of the forward braking.

While the form of embodiment of the invention as herein disclosed constitutes a preferred form, it is to be understood that other forms might be adopted as may come within the scope of the claims which follow.

What is claimed is as follows:

1. A brake structure comprising, a pair of brake shoes within a rotatable drum, anchor means providing an immovable stop engaged by two adjacent ends of the shoes, applying means between the shoes operative to move them into frictional engagement with the drum, a brake shoe adjusting device between the other two adjacent ends of the shoes comprising two elements one threadedly received in the other for axial extension of the elements upon rotation of one relative to the other, one of said elements having ratchet serrations on the periphery thereof through which to obtain said relative rotation, an actuating member operatively engaging said serrations to effect said relative rotation, and means effecting frictional engagement of said operating member with the shoe carrying the same for support of the said member on the said shoe and for movement of the said member with the said shoe, an operating member carried by one of said shoes, said operating member having means engaging said anchor means to limit movement of said member with said shoe and effect oscillations of said operating member relative to said shoe after predetermined movement of the said member with the said shoe, said operating member including an abutment engaging said actuating member to effect operation thereof by the oscillations of said operating member and thereby effect said relative rotation between said two elements.

2. In combination, a brake drum, a pair of brake shoes within said drum and engageable therewith, anchor means providing an immovable stop engaged by two adjacent ends of the shoes, applying means between the shoes operative to move them into frictional engagement with the drum, a brake shoe adjusting device between the other two adjacent ends of the shoes comprising two elements one attached to either of the said other two adjacent ends of the shoes, one of said elements threadedly receiving the other for axial extension of the elements to adjust the brake shoes thereby upon rotation of one element relative to the other, one of said elements having ratchet serrations on the periphery thereof through which to obtain said relative rotation, an actuating member pivotally mounted on one of said shoes and operably engaging said serrations to effect said relative rotation upon oscillatory movement of said actuating member about the pivot for the same, an operating member carried on the said one shoe and having one end thereof suspended on said anchor means and the opposite end engaging said actuating member, means effecting frictional engagement of said operating member with the said one shoe for support of the said operating member on the said one shoe for movement of the said operating member with the said one shoe, said suspension connection of said operating member on said anchor means effecting limitation of movement between said operating member and said one shoe to effect thereby oscillation between said operating member and said one shoe and thereby effect movement between said operating member and said actuating member to operate said actuating member to effect relative rotation between said two elements.

3. A structure in accordance with claim 1 in which the engagement of said operating member with said anchor means is effected by means of an elongated slot provided in said operating member and fitting over said anchor means.

4. A structure in accordance with claim 1 in which the said operating member comprises a flat arcuate strap of substantially the same arcuate shape as the shoe and frictionally engages a web of the shoe extending radially of the brake drum.

5. A structure in accordance with claim 2 in which the engagement of said operating member with said anchor means is effected by means of an elongated slot provided in said operating member and fitting over said anchor means.

6. A structure in accordance with claim 2 in which the said operating member comprises a flat arcuate strap of substantially the same arcuate shape as the shoe and frictionally engages a web of the shoe extending radially of the brake drum.

References Cited in the file of this patent

UNITED STATES PATENTS

| | | |
|---|---|---|
| 2,060,429 | Smith | Nov. 10, 1936 |
| 2,236,777 | Ludwig | Apr. 1, 1941 |
| 2,287,238 | Goepfrich | June 23, 1942 |
| 2,327,819 | Robeson | Aug. 24, 1943 |